UNITED STATES PATENT OFFICE.

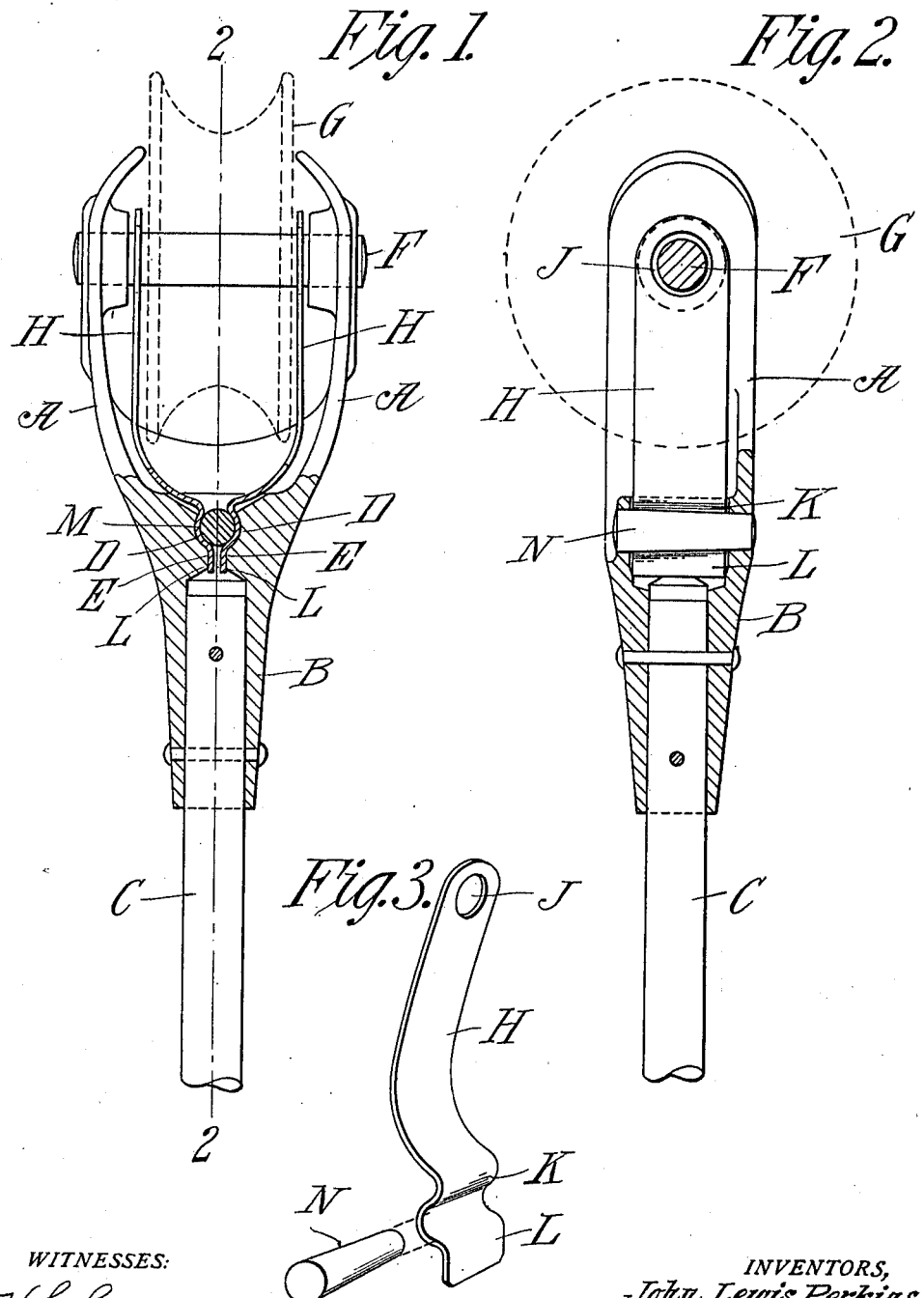

JOHN LEWIS PERKINS AND CLESSON W. PUTNAM, OF HOLYOKE, MASSACHUSETTS, ASSIGNORS TO B. F. PERKINS AND SON, INCORPORATED, OF HOLYOKE, MASSACHUSETTS, A CORPORATION OF MASSACHUSETTS.

TROLLEY-HARP.

993,792.

Specification of Letters Patent. Patented May 30, 1911.

Application filed January 28, 1910. Serial No. 540,525.

*To all whom it may concern:*

Be it known that we, JOHN LEWIS PERKINS and CLESSON W. PUTNAM, citizens of the United States of America, and residents of Holyoke, in the county of Hampden and State of Massachusetts, have invented certain new and useful Improvements in Trolley-Harps of which the following is a full, clear, and exact description.

This invention relates to improvements in trolleys for electric railway cars, and the main object of the invention is the provision of conducting means which will always remain in their proper location and position, which may be readily applied and removed when found necessary, and which will be of simple and inexpensive construction, and thoroughly efficient and practical from every standpoint.

To attain the desired object, the invention consists in the combination with the trolley wheel of conducting springs having means for retaining them in proper relation; and the invention further consists in the novel construction and combination of parts for service substantially as disclosed herein.

In order that the detail construction and the operation of our improvements may be readily understood, and the advantages resulting therefrom be fully appreciated, we have illustrated in the accompanying drawings a trolley constructed in accordance with and embodying our invention, in which drawing:—

Figure 1 represents an elevation of a trolley wheel, harp and support equipped with our improvements, partly in section to more clearly show details of construction; Fig. 2 represents a sectional view on line 2—2, Fig. 1. Fig. 3 represents a detail view in perspective of one of the contact members or springs and the securing means.

The trolley harp may be made in one piece to provide the pair of jaws A and the depending socket B to receive the upper part C of the trolley pole; and the harp is further provided with the seat or recess D having the reduced depending portion or neck E.

In the jaws A of the harp is mounted the stud F upon which revolves the trolley wheel G; and resting in contact with the trolley wheel and arranged in a vertical plane is the pair of contact springs H having openings J to encircle the stud F and formed each near their lower extremity with a bulging or curved portion K shaped to conform to the recess or seat D and with inwardly extending straight ends L for fitting the reduced portion or neck E of said recess, and for making electrical connection with the stem C at its upper end.

When in position the pair of contact springs lie in vertical planes and adjacent the trolley wheel; and the curved portions of said springs provide when in position a round passage or opening M in which is inserted a transverse pin or plug N which engages the curved portions of the plates and retains said springs at all times in the proper position with reference to the trolley wheel.

It is evident that we provide a trolley which permits the ready insertion or removal of either or both of the conducting springs, also that at all times and under all conditions the springs are retained in the proper location with reference to the trolley wheel to insure the best possible results and that the bowing of the plates as shown causes them to tend to normally spring inward toward the trolley wheel. This prevents the springs from contacting with the jaws of the harp. It will also be seen that the improvements are thoroughly practical and attain all of the objects for which the invention is devised.

We claim:—

1. A trolley harp, a supporting shaft, and a trolley wheel mounted thereon, said harp having a recess in its base whose axis is at right angles to the axes of the pole and wheel in combination with a pair of separate contact springs, the lower portions of which have bent portions which fit against the walls of said recess and a tapering member adapted to be driven in between said spring plates to bind them firmly against the walls of said recess, substantially as shown and described.

2. The combination with a trolley harp, a supporting shaft, and a trolley wheel mounted thereon, said harp having a recess in its base whose axis is at right angles to the axes of the pole and wheel, of a pair of separate spring contact plates, the outer ends of which loosely encircle said shaft, and a tapering member adapted to be driven crosswise of and between said plates to bind said spring plates in the recess.

Signed by us at Holyoke, Mass., in presence of two subscribing witnesses.

JOHN LEWIS PERKINS.
CLESSON W. PUTNAM.

Witnesses:
FRED P. CLEVELAND,
ROBERT M. PRESTON.

Copies of this patent may be obtained for five cents each, by addressing the "Commissioner of Patents, Washington, D. C."